Oct. 28, 1958 J. M. KAUFMAN 2,858,372

INTERCEPTION BLOCK FOR TELEPHONE EXCHANGES

Filed Aug. 19, 1954

John M. Kaufman
INVENTOR.

BY Clarence A. O'Brien
and Harvey B. Jacobson
Attorneys

United States Patent Office 2,858,372

Patented Oct. 28, 1958

2,858,372

INTERCEPTION BLOCK FOR TELEPHONE EXCHANGES

John M. Kaufman, Middletown, Ohio

Application August 19, 1954, Serial No. 450,836

1 Claim. (Cl. 179—91)

Figure 1:
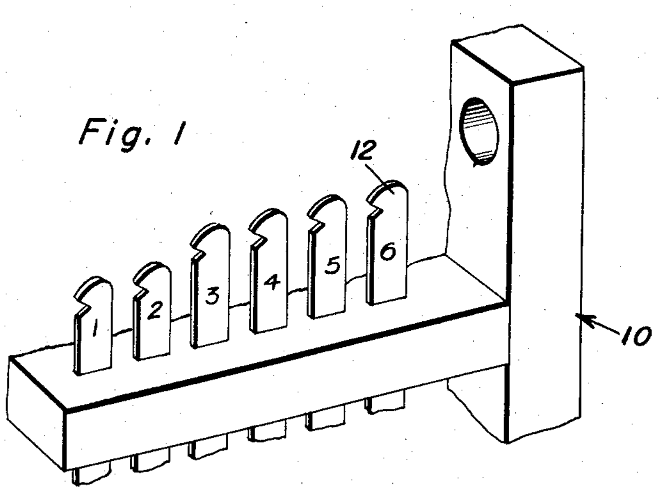

This invention relates to connectors to be used in telephone exchanges and it has for its special object to provide means for making certain semi-permanent or permanent connections which are frequently necessary in connection with intercepting telephone calls on the switchboard of an automatic or non-automatic telephone exchange.

It is a principal object of the invention to provide a simple and effective means for producing connections, preferably interceptor connections which can be instantly made and can be instantly removed and which need neither fixation nor special means for producing contacts.

A further object of the invention consists in providing a device in which the means for fixing a contact device, the means for producing contacts between the terminal lugs of a terminal plug in a telephone exchange and those of a contact device and also the means for producing internal connections between the terminal lugs are identical.

When a telephone subscriber moves to other premises or is disconnected and when his call number is changed or is assigned to another party it is necessary to intercept incoming calls for some time in order to inform the calling party of the change which has been made. This is invariably done by placing the telephone line "on intercept" or on "cross cut." The connection with the subscriber's line is removed and the cross cut is made, an operation which is manually performed by wrapping so-called intercepting straps around the terminal lugs to be connected so that the calling line when attempting to make a connection with an inactive line is automatically connected with the intercept operator.

The intercept operator then intercepts the call and offers assistance or information to the calling subscriber.

The placing of the intercepting straps is done manually. It is a time consuming operation especially if a large number of intercepting operations has to be performed at the same time which is frequently the case, for instance when an area must be evacuated and all the telephone numbers of a block or several blocks are changed.

According to the invention, an interceptor block is used which is adapted to make simultaneously any number of internal connections, the interceptor block being provided for this purpose with a series of clamping contacts which are adapted to grip the terminal strips or lugs on the terminal block of the frame. On this connector or interceptor block the connections between the clamping contacts associated with the block are fixedly preformed and it is therefore only necessary to slip the block over the terminal lugs in order to connect the terminal contacts of the telephone number block with each other. The terminal blocks are almost invariably arranged in a vertical or horizontal position and the terminal lugs project from them. Such terminal lugs are formed by spaced parallel flat strips, punched out of metal with a hook-like end projection. The clamps of the interceptor block are therefore so arranged and so spaced that a plurality of flat strips forming the terminal lugs may enter the clamps held by the block simultaneously and may be firmly gripped under some elastic pressure. If a sufficient number of clamps is arranged on the block all connections are made simultaneously by the slipping of the block over the terminal lugs.

The block may form a closed casing with as many slots as there are clamps and the clamping contacts may be housed completely within the block which may be slid over the terminal lugs until they are deeply and firmly seated on the same as each strip forming the terminal lug is seized and gripped by the clamping springs.

Testing means for making test connections with the terminal lugs of a subscriber's line have been proposed, this test connection usually being mounted on a test clamp or bail which may be clamped to a terminal block and which carries movable contacts which are moved to contact positions relatively to the terminal lugs. Obviously such devices require mounting on the terminal block and operating of the movable contacts one at a time to establish a fleeting test connection for a short period of time during which tests are made, the test clamp being then moved and the operation being repeated using the terminal lugs on another line.

These arrangements require a holding or gripping means which is either itself a contact carrier or which carries the latter and which, after having been fixed on the terminal block or other structure, serves as a fixed base relatively to which the movable contacts may now be moved until they get into touch with the terminal lugs. The connections which the said movable contacts make with the terminal lugs are used for making connections with external testing apparatus.

The device according to the invention has the advantage that the gripping, contact making and the making of connections between the terminal contact lugs are all one and the same operation, performed by slipping the interceptor block with its clamp contacts on the terminal lugs whereby the line to be intercepted is connected with the interceptor operator's set. The interceptor block therefore needs neither fixation nor seating for movable contacts; it produces automatic connections between the terminal lugs on which the block is seated, no outer connections being made by this device.

The invention is illustrated by way of example in the accompanying drawings showing one embodiment thereof by way of example. It is, however, to be understood that the embodiment shown has been selected in order to illustrate the principle of the invention and one of the modes of applying said principle. The specific construction illustrated in the drawings may, however, be modified in many respects, as will be clear to the expert skilled in the art, without departing from the principle of the invention.

Figure 2:
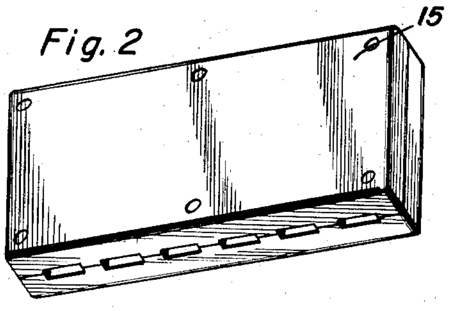
Figure 4:
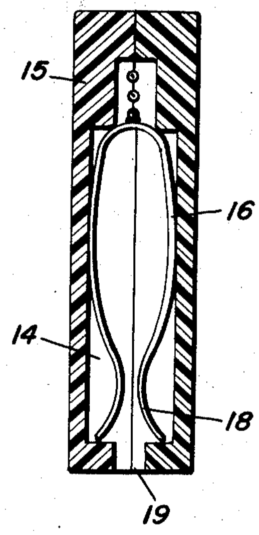
Figure 3:
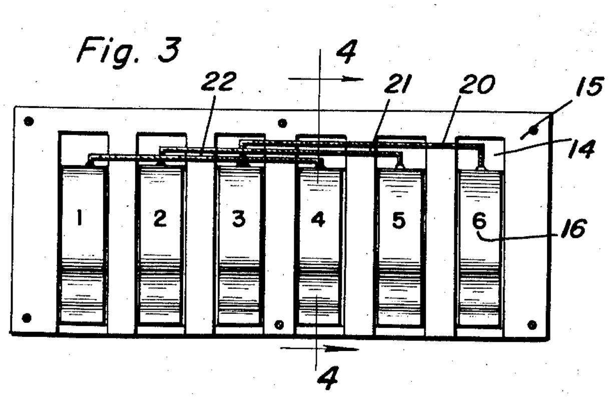

In the drawings:

Figure 1 is a perspective view of a portion of the terminal block carrying the terminal lugs, Figure 2 is a perspective outside view of the interceptor block, Figure 3 is a sectional elevational view of the interceptor block, the section being made through the median plane of the block, and Figure 4 is a sectional elevational view of the interceptor block, the section being taken along line 4—4 of Figure 3.

In Figure 1 a portion of the terminal block 10 is shown for the purpose of illustrating the manner in which the device according to the invention is used. This block 10 is of a well known type with which the horizontal side of an intermediate distributing frame is conventionally equipped. The terminal block 10 carries the terminal lugs 12 which are marked 1, 2, 3, 4, 5, 6. Each of the terminal lugs usually forms part of a row of similar lugs which are, however, not shown.

The drawing is simplified and it is assumed that, for instance, the terminal lugs 1, 2, 3 are those connected with the interceptor operator's set on one side and the terminal lugs 4, 5, 6 are connected with the connector of a subscriber's line on one side and with the subscriber's station on the other side.

A block 15 of plastic or other insulating material is provided with a cavity or with cavities 14 which end in slots 19 at one end of the block. Each cavity 14 may be just wide enough to hold clamp spring contacts 16 which consist of a bent leaf spring the ends 18 of which are curved bent towards each other so that they almost meet and, therefore, form a clamping device adapted to clamp a strip like contact between them. The springs are preferably made of highly conductive material such as copper or bronze. Each spring is connected with a wire 20, 21, 22 which leads to another clamp spring contact of the set. The whole set consists of the springs which have been numbered 1, 2, 3, 4, 5, 6 the numbers corresponding to those with which the terminal lugs have been provided.

The block 15 may be made in two pieces which are held together by suitable means or may be made of one piece. The cavities 14 may merely be recessed portions of a central cavity joining all the cavities 14. If the block is made of one piece the width of the slot may be suitably chosen in order to be able to insert the springs connected by wires and the slot 19 may be continuous. Once inserted the clamping spring is automatically held in place behind the step at the bottom of the cavity or of the recess 14. The device thus holds the springs 16 in spaced relationship with each other with the springs connected with each other in a predetermined manner which, by way of example, is indicated in Figure 3. In this figure it will be seen that spring 1 is connected with spring 4, spring 2 with spring 5 and spring 3 with spring 6. These connections are, of course, only shown by way of example.

In operation after the connections with the subscriber's line have been removed as is the usual practice when a station is on intercept the block 15 is slipped over a series of terminal lugs 1, 2, 3, 4, 5, 6, which enter the slots 19, the springs 16 immediately engaging the lugs at their ends 18 and thereby seating the block 15 firmly on the terminal lugs; simultaneously the connections between the lugs 1 and 4, 2 and 5 and 3 and 6 are completed. Fixation or seating, and contact making between the clamping springs and the terminal lugs and the making of the internal connections between the terminal lugs are thus one and the same operation.

The clamps gripping and pressing against the terminal lugs provide terminal connections which possess the electrical reliability and permanence of soldered connections while they may be removed instantly breaking the terminal connection without having to overcome any resistance or having to expend any sustained effort. Moreover the clamps provide also a simple means producing a reliable contact wtih lugs which are of different lengths without the risk of a connection being made only with some lugs.

The block in addition presents a surface which may be used for indicia to indicate one of the categories or states which the line has been given. Usually there are at least three such states. The line may be classified as a "dead line" or it may be in the state of "denial" or it may be in the state of "suspension." Colors and/or other means may be used to designate each of these three states by coloring the block surface completely or partly or by using other indicia affixed to the block surface. The block possesses a sufficiently large outer surface so that the color may also be supplemented by other indicia.

The interceptor block according to the invention thus provides a very simple effective means of establishing the desired connections accurately and reliably without having to expend much effort or skilled labor. Likewise the removal is a simple operation which does not entail the expenditure of skilled labor.

It will be understood that the making of contacts by these means in order to establish connection between terminal lugs may also be used in connection with operations other than intercepting if need be.

It will further be understood that unessential changes may be made without in any way departing from the essence of the invention as defined in the annexed claim.

What is claimed as new is as follows:

In a telephone exchange provided with terminal blocks, each block including a set of longitudinally aligned parallel terminal lugs projecting in two directions from said number block and divided into two groups, one group of which is permanently connected with a subscriber's connector and with the subscriber's station during normal service while the other group is connected with an intercept operator's set, an interceptor block for making connections between the terminal lugs permanently connected to the subscriber's connector and the terminal lugs connected with the intercept operator after removal of the normal service connections with the subscriber's station, said interceptor block consisting of a hood provided with a number of cavities equal in number and in spacing to the terminal lugs, each cavity holding a gripping socket contact, adapted to grip a terminal lug, the interceptor block being thus adapted to be slipped over and to be held by the projecting terminal lugs, with each gripping socket contact being in contact with one terminal lug, and preformed fixed connections between the socket contacts gripping the group of terminal lugs connected with the connector of the subscriber's station and the socket contacts gripping the terminal lugs connected with the intercept operator's set.

References Cited in the file of this patent

UNITED STATES PATENTS

| | | |
|---|---|---|
| 966,728 | Adams | Aug. 10, 1910 |
| 1,223,750 | Wakefield | Apr. 24, 1917 |
| 1,549,242 | Wilson | Aug. 11, 1925 |
| 1,955,513 | Peterson | Apr. 17, 1934 |
| 2,762,026 | Knohl | Sept. 4, 1956 |

FOREIGN PATENTS

| | | |
|---|---|---|
| 580,443 | Germany | Jan. 17, 1931 |